Aug. 14, 1934.  C. W. MANSUR  1,970,536
WINDING MACHINE
Filed Aug. 17, 1932
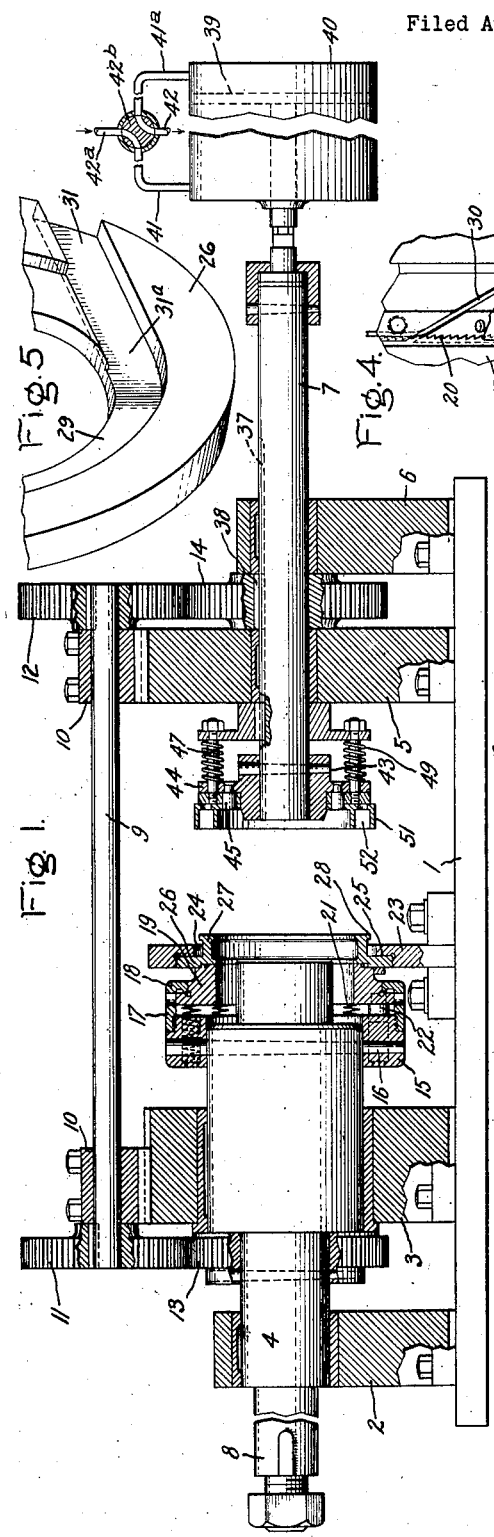
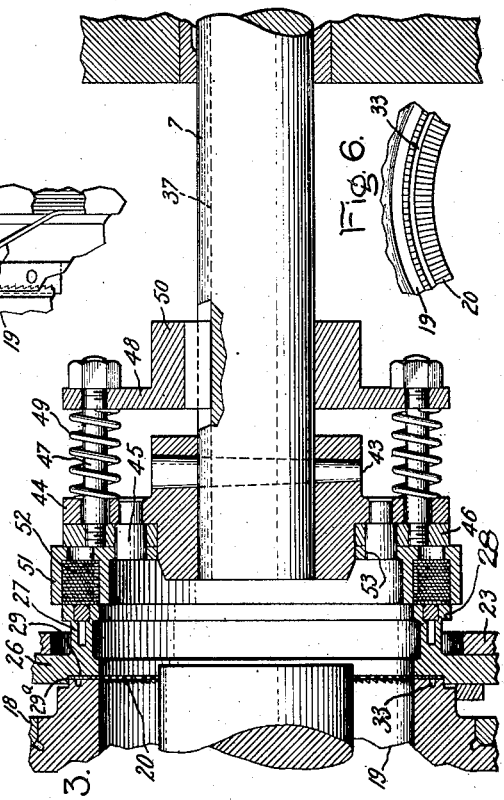
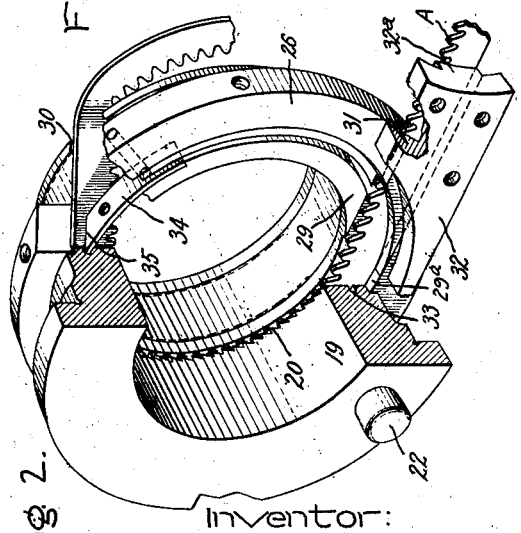
Inventor:
Clarence W. Mansur,
by Charles E. Fuller
His Attorney.

Patented Aug. 14, 1934

1,970,536

UNITED STATES PATENT OFFICE 1,970,536

WINDING MACHINE

Clarence W. Mansur, Malden, Mass., assignor to General Electric Company, a corporation of New York Application August 17, 1932, Serial No. 629,150

9 Claims. (Cl. 153—64.5)

The present invention relates to winding machines for winding edgewise on itself a strip of woven fabric to form a ring of suitable thickness. One application of the invention is winding rings from strips of woven fabric treated with an adhesive such as an artificial resin for use in the manufacture of non-metallic gear wheels or gear wheel blanks of the type disclosed in my application Serial No. 629,149, filed on even date herewith.

The object of my invention is to provide an improved construction and arrangement in a machine of this type, and for a consideration of what I believe to be novel and my invention, attention is directed to the following description and the claims appended thereto.

In the drawing, Fig. 1 is a longitudinal sectional view of a winding machine embodying my invention; Fig. 2 is a perspective view partly in section of certain parts; Fig. 3 is a detail view on a larger scale of parts of the machine, the parts being shown in positions different from that in Fig. 1; Fig. 4 is a top plan view of a portion of the structure shown in Fig. 2; Fig. 5 is a detail perspective view of certain parts; and Fig. 6 is a face view of a portion of a driving ring.

Referring to the drawing, 1 indicates a bed plate or base having at one end bearing brackets 2 and 3 in which is mounted a driving shaft 4, and at the other end bearing brackets 5 and 6 in which is mounted a driven shaft 7. Driving shaft 4 is provided at its one end with a portion 8 of reduced diameter upon which may be mounted a driving pulley, a driving gear or other driving means. Driving shaft 4 is connected to driven shaft 7 through the intermediary of a shaft 9 supported in bearings 10 which are bolted on the tops of bearing brackets 3 and 5. On the ends of shaft 9 are gears 11 and 12 which mesh with gears 13 and 14 mounted on driving shaft 4 and driven shaft 7 respectively. The pairs of gears 11, 13 and 12, 14 are of such sizes relatively to each other that shaft 4 turns slightly faster than shaft 7. This result can be accomplished by providing gear 11, for example, with a greater number of teeth than gear 12, gears 13 and 14 being alike. The purpose of this is explained more fully hereinafter.

Mounted on the inner end of shaft 4, which is larger in diameter than the outer end, is a collar 15 fastened in position by a pin 16 which extends through the collar and shaft. Collar 15 is provided with a threaded neck on which is screwed a holding ring 17 having an inturned flange 18. Held within the space between inturned flange 18 and collar 15 is a driving ring 19 having teeth 20 extending radially across its outer face. Teeth 20 are fairly small and have sharp edges. They are straight on their forward side and sloping on the rear side. The inner face of driving ring 19 is spaced somewhat from collar 15 and is held in its forward position against flange 18 by a number of springs 21 arranged in sockets in collar 15. Also on the rear face of driving ring 19 are guide pins 22 which slide in sockets in collar 15. By this arrangement, driving ring 19 is caused to turn with driving shaft 4 and collar 15 and it can move axially relatively to collar 15 to a limited extent against the action of springs 21. Mounted on a base 1 in front of driving ring 19 is a fixed plate 23 having a circular opening 24 at one side of which is a recess 25. Rigidly fastened in recess 25 is a ring 26 having a forwardly projecting collar 27 with an enlarged or flanged end 28. On the side of ring 26, opposite collar 27, is a recess which provides a flat surface 29 directly adjacent to the teeth 20 of driving ring 19, and a guide shoulder 29ª which surrounds the toothed edge of driving ring 19.

Ring 26 and projecting collar 27 are provided with a transversely extending diagonal slot 30 which extends entirely through them, as best shown in Figs. 2 and 4. Slot 30 is arranged adjacent to the upper portion of ring 26. Adjacent to its lower portion, ring 26 is provided with a feed slot 31 which is covered by a block 32 fastened at its outer end to plate 23. Block 32 has a rib 32ª which fits between the walls of slot 31 and conforms to the curvature of ring 26, (see Fig. 2). Slot 31 extends tangentially across the lower portion of ring 26 and communicates at its inner end with a space between the outer face of driving ring 19 and surface 29 of ring 26. Toward its inner end, the bottom wall of slot 31 inclines outwardly, becoming finally flush with the surface of the ring. This is indicated at 31ª in Fig. 5. This provides a sort of wedge shaped passage at the inner end of slot 31 which serves to permit the end of a strip inserted into slot 31 to be brought under the teeth 20 and then moved outwardly so as to be caught by teeth 20 and carried around by the driving ring. I find it advantageous to so incline the bottom wall of the slot that the teeth first catch the outer edge of a strip end inserted in the slot. This can be accomplished by starting the incline at the outer edge of the slot in advance of the incline at the inner edge of the slot. In other words, starting the incline along a diagonal line.

In Fig. 2, a strip A is shown as having been inserted through slot 31 and carried around by the teeth of driving ring 19 and passed outward through diagonal slot 30. In the front face of driving ring 19 in which teeth 20 are located is a circular groove 33 in which is located one edge of a curve plate 34 attached to ring 26. The free end of curved plate 34 is provided with a curved beveled edge 35 which is located adjacent to the entrance edge of slot 30 and serves to direct a strip A from between driving ring 19 and surface 29 into the slot 30.

I have found by experience that it is very desirable and advantageous for best results to locate annular groove 33 about midway between the center and the outer edge of the face of ring 19. When so located, the end of plate 34 will catch under the end of a strip being fed forward by driving ring 19 and direct it evenly and smoothly into diagonal slot 30.

Driven shaft 7 is relatively long compared to its bearings and is adapted to move axially through them and gear wheel 14. To this end shaft 7 is provided with a longitudinally extending key-way 37 in which is located a key 38 which fastens gear wheel 14 to shaft 7. The outer end of shaft 7 is connected to a piston 39 which is located in a cylinder 40. Cylinder 40 is relatively long so that the desired axial movement of shaft 7 may be obtained. At opposite ends of cylinder 40 are pipes 41 and 41ª which may be connected either to an exhaust pipe 42 or to a pressure supply pipe 42ª by a multi-way valve 42ᵇ. By this means, air or other actuating fluid may be admitted to either end of the cylinder and discharged from the other end to effect movement of the piston in the cylinder. Fastened to the inner end of shaft 7 by means of a pin 43 is a collar 44 to which is fixed a plurality of guide pins 45. Mounted to slide on guide pins 45 is a disk 46 to which are attached the inner ends of a plurality of studs 47. Studs 47 pass loosely through openings in collar 44 and at their outer ends through openings in a collar 48 which is splined on shaft 7. Surrounding studs 47 between collars 44 and 48 are springs 49 which serve normally to hold disk 46 in engagement with collar 44. The hub 50 of collar 48 is adapted to engage bearing bracket 5 to effect a movement of disk 46 away from collar 44, as hereinafter described. Guide pins 45 normally project beyond disk 46 and are adapted to receive a holder 51 having an annular channel 52 in which a strip A is wound. Channel 52 is of a diameter and width such that flanged end 28 fits into it. It is provided with openings 53 adapted to fit over the ends of pins 45. Also, the width of channel 52 is such that a strip A to be wound therein fits snugly in the channel so that it binds therein somewhat, the binding action serving to hold the strip and cause it to travel with the holder.

The operation is as follows: Assume that the parts are in the positions shown in Fig. 1, an empty holder 51 having been placed on pins 45. First the operator turns valve 42ᵇ to a position wherein it connects the outer end of cylinder 40 to pressure supply pipe 42ª, the inner end of the cylinder being connected to discharge pipe 42. Piston 39 moves forward in cylinder 40, shaft 7 sliding axially through its bearings and through gear wheel 14 until holder 51 strikes collar 27, the collar entering channel 52 and resting on the bottom of it. Power is now applied to turn shafts 4 and 7, if it has not been done already. Driving ring 19 and holder 51 thus both turn on opposite sides of ring 26, ring 26 being stationary. The end of strip A to be wound on itself edgewise is now inserted through slot 31 toward the space between teeth 20 on driving ring 19 and the adjacent surface 29 of stationary ring 26. Strip A may be of a length to form a completed ring of the desired thickness. The strip may be wound flatwise on an arbor from which it is unwound as the machine operates or it may be fed directly from a cutting machine or former for the strip. In any event, when the end of strip A is fed through the slot 31, the end slides up the inclined portion of slot 31 to a position between ring 19 and surface 29 and is grasped by teeth 20 and carried around between the teeth and adjacent surface 29. As the end of the strip reaches the upper side of driving ring 19, it is caught by the curved beveled edge 35 of plate 34 and carried through slot 30 into channel 52 of holder 51, between the bottom of the channel and flanged end 28. As the strip is fed around by teeth 20, it is wound edgewise in channel 52 between the bottom of the channel and flanged end 28. The end of the strip being slightly wider than channel 52 binds in the channel so it is carried around with it. As the channel is filled with successive turns of the strip, holder 51 moves axially relatively to flanged end 28 against the pressure of the actuating fluid in cylinder 40, the piston 39 being forced back in the cylinder. The pressure in cylinder 40 is high enough so that flanged end 28 is held against the turns in channel 52 with a suitable pressure such that the successive turns are packed closely together. As the strip is carried around by driving ring 19, it is forced to assume a curved shape since its outer edge slides along the guide surface 29ª, which functions as a forming or shaping surface. As the strip turns to assume a curved shape, the material between the projections at the inner edge of the strip is upset or compressed (or, in other words, squeezed together) and is ironed down smooth by the pressure between the driving ring 19 and ring 26. At the same time, the material at the outer edge of the strip is stretched. The net result is that the strip leaves slot 30 in curved form, the curvature being such that it corresponds to the curvature of channel 52 in the holder. In being formed to take a curved shape, the strip is shortened slightly and it is for this reason that shaft 7 is made to turn slightly slower than shaft 4. The difference in speed of the two shafts must be such as to compensate for the change in length of the strip so that it is wound in the holder exactly at the rate at which it is forced from the slot 30. By this arrangement a smooth even winding of the strip in the holder is obtained. The difference in speed required can be determined by experiment. It is not great. For example, in one instance, I found a difference of two teeth between gears 11 and 12 to be sufficient.

In connection with the operation of the structure, shoulder 29ª forms a guiding or directing surface for the strip to force it to take a circular form. The strip is positively carried along by the driving ring and after being forced into its circular form is pushed through slot 30 into the holder as opposed to being pulled through the slot into the holder. This is one important feature of my invention since by positively carrying the strip through between 19 and surface 29 (which may be termed the forming or shaping part of the structure), and then pushing the material into the holder between flanged end 28 and the bottom of channel 52 (which may be termed the receiving part of the structure), I am enabled to smoothly and evenly wind a strip edgewise without crinkling or binding of the strip in either part of the machine.

The springs 21 serve to hold driving ring 19 forward against surface 29 and to permit it to move axially the amount required in order that the strip may enter between the teeth 20 and surface 29.

After the desired number of turns have been wound in channel 52 of holder 51, for example, after the channel is filled, as shown in Fig. 3, valve 42$^b$ is reversed in position to admit pressure to the forward end of cylinder 40 and permit it to escape from the rear end thereof. Piston 39 then moves back toward the Fig. 1 position and when hub 50 strikes bearing bracket 5, it is pushed forward against the action of springs 49 to move plate 46 on guide pins 45, thereby pushing holder 51 off the guide pins 45. The operator catches the filled holder from which the wound up ring is later removed. At the same time, he releases the air pressure thereby permitting springs 49 to move shaft 7 toward the left, as shown in Fig. 1, returning plate 46 to its normal position. An empty holder 51 is then placed on guide pins 45, after which the operation is repeated. Rotation of shafts 4 and 7 may or may not be stopped while a full holder 51 is removed and an empty one substituted, as found desirable. Preferably the holders are removed and positioned while the shafts are running as this saves time. A suitable fixture may be used for feeding an empty holder onto pins 45.

By my invention, I am enabled to rapidly and evenly wind edgewise into a holder a straight strip of woven cloth, thereby providing a member which may be used in the manufacture of non-metallic gear wheels or for other purposes.

What I claim as new and desire to secure by Letters Patent of the United States is:

1. An edgewise winding machine comprising driving and driven shafts in axial alignment, means for rotating said shafts at substantially the same speed, a fixture for bending a strip edgewise having a part carried by one of said shafts, a holder for receiving the bent strip carried by the other of said shafts, and means for guiding a strip from the fixture to the holder.

2. An edgewise winding machine comprising a fixture having a rotating part for bending a strip edgewise, a holder having an annular groove, means for directing a strip from the fixture into said groove, and means for simultaneously rotating the fixture part and holder.

3. An edgewise winding machine comprising a fixture having a rotating part for bending a strip edgewise, a holder having an annular groove, means for directing a strip from the fixture into said groove, means for simultaneously rotating the fixture part and holder, and means for moving the fixture and holder axially relatively to each other.

4. In an edgewise winding machine, a fixture comprising a fixed member and a rotating member having adjacent faces, at least one of which is provided with teeth, means forming a slot through which a strip of material to be wound may be inserted between said faces, means providing a slot through which a strip of material is discharged from between said faces, a holder for receiving material from said last named slot, and means for rotating the one fixture member and the holder.

5. In an edgewise winding machine, a fixture comprising a fixed member and a rotating member having adjacent faces at least one of which is provided with teeth, and a curved guide surface, means forming a slot through which a strip of material to be wound may be inserted between said faces with an edge in engagement with the guide surface, a discharge slot through which material being wound is pushed from between said faces, a holder having an annular groove for receiving material from said slot, and means for rotating the one fixture member and the holder.

6. In an edgewise winding machine, a fixture having a rotating part and means for bending a strip edgewise, a holder for receiving the strip from the fixture, and means for rotating said part and holder, said holder being rotated slower than the fixture by an amount such that it compensates for the change in length of the material being wound due to the winding operation.

7. In an edgewise winding machine, a stationary member having an annular surface and a curved guide surface, a driving ring facing the annular surface, means providing a feed slot and a discharge slot communicating with the space between said driving ring and annular surface, a holder having an annular groove, and means for rotating the driving ring and holder.

8. In an edgewise winding machine, a stationary member having a curved guide surface and projecting collar, a driving ring for forcing a strip to be wound edgewise around said guide surface, said member having a discharge slot, a holder having an annular groove to receive the strip being wound, said projecting collar being adapted to enter said groove, means for moving the holder axially relatively to the stationary member, and means for rotating the driving ring and the holder.

9. In an edgewise winding machine, a stationary ring having a flat surface and a curved forming surface, said ring being provided with a feed slot and a discharge slot, and a driving ring having a toothed end which faces said flat surface, said toothed end being provided with an annular groove adjacent to its outer edge, and a guide member in said groove for directing a strip being wound into the discharge slot.

CLARENCE W. MANSUR.